United States Patent [19]

Dunlap

[11] Patent Number: 5,442,031
[45] Date of Patent: Aug. 15, 1995

[54] POLYIMIDES FROM OXYDIPHTHALIC ANHYDRIDE AND 2,4-DIAMINOTOLUENE

[75] Inventor: Beth E. Dunlap, Lyndhurst, Va.

[73] Assignee: E. I. Du Pont de Nemours and Company, Wilmington, Del.

[21] Appl. No.: 230,951

[22] Filed: Apr. 21, 1994

[51] Int. Cl.⁶ .................. C08G 69/26; C08G 73/10
[52] U.S. Cl. ................... 528/353; 528/125; 528/128; 528/172; 528/173; 528/179; 528/183; 528/188; 528/220; 528/229; 524/600; 524/606; 428/364; 428/395; 428/473.5; 525/436
[58] Field of Search ............. 528/353, 350, 125, 128, 528/172, 173, 179, 183, 188, 220, 229; 524/600, 606; 428/473.5, 364, 395; 525/436

[56] References Cited

U.S. PATENT DOCUMENTS

| 3,870,677 | 3/1975 | Farrissey, Jr. et al. | 524/600 |
| 4,535,115 | 8/1985 | Bakshi et al. | 524/600 |
| 4,778,872 | 10/1988 | Sasaki et al. | 528/183 |
| 5,089,549 | 2/1992 | Kato | 524/600 |
| 5,147,966 | 9/1992 | St. Clair et al. | 524/600 |

FOREIGN PATENT DOCUMENTS

| 63-193927 | 8/1988 | Japan . |
| 5086348 | 4/1993 | Japan . |

*Primary Examiner*—Samuel A. Acquah
*Assistant Examiner*—P. Hampton-Hightower

[57] ABSTRACT

Soluble polyimides are formed from oxydiphthalic anhydride and 2,4-diaminotoluene. Optionally, up to 30 mole % of an alternate diamine and up to 50 mole % of an alternate dianhydride can be used with the oxydiphthalic anhydride and 2,4-diaminotoluene.

6 Claims, No Drawings

POLYIMIDES FROM OXYDIPHTHALIC ANHYDRIDE AND 2,4-DIAMINOTOLUENE

BACKGROUND OF THE INVENTION

Aromatic polyimides are known for their excellent thermal stability, chemical and solvent resistance, and light stability. They are used as industrial films, coatings, adhesives, and moldings. Economic fiber development from polyimide polymer has been hindered because of the insolubility of the imidized polymer in conventional solution-spinning solvents; fiber formation from melts has been hindered because the melt temperatures are very close to or higher than the polymer decomposition temperature.

Processing in the prior art has dealt with this problem by forming materials from the polyimide precursor, poly(amic acid). A typical method of manufacture consists of reaction of a dianhydride and a diamine to form a poly(amic acid). The latter is normally soluble and processable. After forming into a fiber or film, the poly(amic acid) is heat treated to imidize the carboxylic groups. This forms the completed insoluble polyimide.

SUMMARY OF THE INVENTION

The present invention provides an aromatic polyimide polymer consisting essentially of the following repeat units:

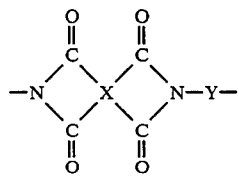

where X is

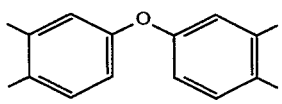

with from 0 to 50 mole %

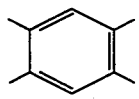

and Y is

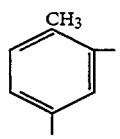

with from 0 to 30 mole %

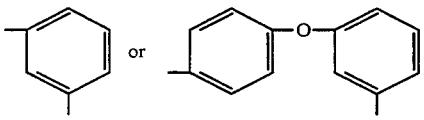

which is soluble in organic solvents, and is capable of being formed into oriented structures.

The polyimide is formed from the reaction of oxydiphthalic anhydride and 2,4-diaminotoluene. Optionally, up to 30 mole % of the 2,4-diaminotoluene can be replaced by another diamine, such as 3,4'-oxydianiline or m-phenylenediamine; up to 50 mole % of the oxydiphthalic anhydride can be replaced by another aromatic dianhydride, such as pyromellitic dianhydride. The polyimide can be made into shaped articles such as film and fiber.

DETAILED DESCRIPTION OF THE INVENTION

This invention provides an aromatic polyimide with certain desired properties, namely solubility in amide solvents. It is prepared from oxydiphthalic anhydride (ODPA), and a particular diamine, namely 2,4-diaminotoluene (TDA). It has been found that the reaction of these two monomers forms an aromatic polyimide which is soluble in organic solvents such as N-methyl-2-pyrrolidone (NMP).

This invention provides a polyimide which can be made and processed in a very simple manner. The polyimide can be synthesized in an organic solvent; and, after reaction byproducts and excess solvent are distilled off and the polymerization is complete, the polymer solution can be formed directly into films or fibrous materials.

Also, it has been found that amide-soluble polyimides result even where up to 50 mole % of the ODPA is replaced by pyromellitic dianhydride, or other suitable dianhydride and/or up to 30 mole % of the TDA is replaced by m-phenylenediamine, 3,4'-oxydianiline, or other suitable diamines.

The polyimide of this invention is made under a dry inert atmosphere. The diamine is supplied to a suitable reaction vessel equipped with a stirrer. The desired organic solvent is then added and the mixture stirred until a solution is formed. The dianhydride is then added, along with additional solvent, and the solution stirred for from 1 to 12 hours.

Water is a byproduct of the reaction and is removed by the addition of o-dichlorobenzene (ODCB), which forms an azeotrope with the water and can be removed by distillation. The solution is then heated for about 4 to 12 hours until the imidization is complete. Solutions containing from 15 to 35% solids have been prepared. Distillation may also remove some of the solvent from the solution.

The aromatic polyimide of this invention exhibits an inherent viscosity greater than 0.5 and can be spun into fibers using conventional methods. It is also useful in films, pulps, etc.

TEST METHODS

Thermomechanical Analysis (TMA) was run on a T-A Instruments Model 2940 with a Model 2200 controller. The samples were run under nitrogen with a 0.050N load at a ramp rate of 5° C. per minute.

Inherent Viscosity. The inherent viscosity of a polymer which is soluble in a suitable solvent is conventionally used as a measure of the degree of polymerization of the polymer and is defined as $$\eta_{inh} = \frac{\ln(t/t_o)}{C}$$

measured by determining the flow times of a solution of the polymer at a concentration C in the solvent at a temperature of 30° C., where t is the flow time of the solution and $t_o$ is the flow time of the solvent alone. With the polymers of the invention, the inherent viscosity values were determined using a solution in N-methylpyrrolidone (NMP) as the solvent, in which the polymer sample was dissolved at a concentration of about 0.5 g of the polymer per 100 ml of the solvent. The inherent viscosity should be sufficient to form films and for fibers of the polymer. Values in excess of about 0.5 are useful for this purpose.

EXAMPLES

The following examples are illustrative of the invention and are not intended as limiting.

Example 1

Preparation of a polyimide consisting essentially of the following repeat units:

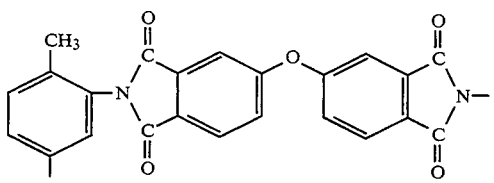

2,4-Diaminotoluene (6.11 g, 0.05 mol) was charged, in a dry box, to a 250 ml 4-neck round bottom flask fitted with a mechanical stirrer, nitrogen purge, drying tube, and rubber septum. NMP (60 ml) was added and stirring started. After the diamine had dissolved, an ice bath was placed under the reaction flask. ODPA (15.51 g, 0.05 mol) was added to the solution with stirring. NMP (24 ml) was added. The ice bath was removed, and the solution was allowed to stir overnight.

The drying tube was removed, and the reaction vessel was fitted with an adapter and condenser. ODCB (21 ml) was added to remove water of reaction through azeotropic distillation. The solution was heated to 165° C. with a heating mantle and held at temperature for 5 hours. Solvent was allowed to distill off. A clear light yellow solution was produced, containing approximately 20% by wt. solids.

The solution was cast into a tough pliable, self-supporting film that was almost colorless. It was then placed in a vacuum oven under $N_2$ purge. The oven was set at 110° C. and the solvent evaporated off. The polymer could also be precipitated with water or alcohol. The inherent viscosity of the polymer was determined to be 0.93 in NMP. The Tg of the film was determined to be 301° C. by TMA. Filaments were formed by wet spinning the solution into a 50/50 mixture of NMP and water. The filaments were then drawn over a hot pin, with resultant filament properties (T/E/M/Den) as high as 1.5 gpd/14%/28 gpd/9.

Example 2

A mixture of TDA (4.58g, 0.0375 mol) and m-phenylenediamine (1.35 g, 0.0125 mol) was charged, in a dry box, to a 250 ml 4-neck round bottom flask fitted with a mechanical stirrer, nitrogen purge, drying tube, and rubber septum. NMP (60 ml) was added and stirring started. After the diamine had dissolved, ODPA (15.51 g, 0.05 mol) was added to the solution with stirring. NMP (23 ml) was added. The solution was allowed to stir for 2 hours.

The drying tube was removed, and the reaction vessel was fitted with an adapter and condenser. ODCB (25 ml) was added to remove water of reaction through azeotropic distillation. The solution was heated to 165° C. with a heating mantle and held at temperature for 8 hours. Solvent was allowed to distill off. A clear dark yellow solution was produced.

The solution was cast into a tough pliable film that was almost colorless. The inherent viscosity of the polymer was determined to be 0.65 in NMP. The Tg of the film was determined to be 235° C. by TMA.

Example 3

2,4-Diaminotoluene (6.11g, 0.05 mol) was charged, in a dry box, to a 250 ml 4-neck round bottom flask fitted with a mechanical stirrer, nitrogen purge, drying tube, and rubber septum. NMP (56 ml) was added and stirring started. After the diamine had dissolved, a mixture of ODPA (8.53 g, 0.0275 mol) and PMDA (4.9g, 0.0225 mol) was added to the solution with stirring. NMP (20 ml) was added. The solution was allowed to stir for 2 hours.

The drying tube was removed, and the reaction vessel was fitted with an adapter and condenser. ODCB (25 ml) was added to remove water of reaction through azeotropic distillation. The solution was heated to 165° C. with a heating mantle and held at temperature for 6 hours. Solvent was allowed to distill off. A clear dark red solution was produced.

The solution was cast into a tough pliable film that was yellow in color. The inherent viscosity of the polymer was determined to be 0.65 in NMP. The Tg of the film was determined to be 370° C. by TMA.

What is claimed is:

1. A polymer solution comprising polyimides consisting essentially of the following repeat units:

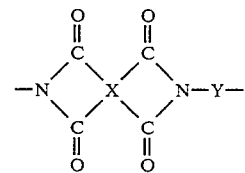

where
X is

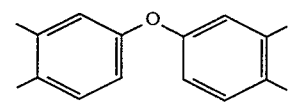

and
Y is

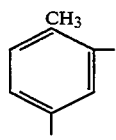

in an amide solvent.

2. A polyimide consisting essentially of the following repeat units:

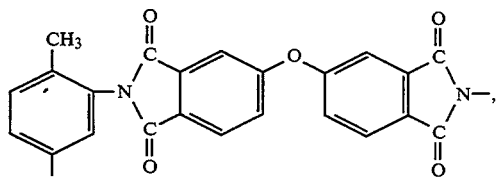

said polyimide having an inherent viscosity, as measured in N-methyl-2-pyrrolidone, in excess of 0.5.

3. A polyimide as in claim 2 having an inherent viscosity as measured using a solution in N-methyl-2-pyrrolidone, in the range of 0.65 to 0.93.

4. A polymer solution as in claim 1 wherein X also consists of from 0 to 50 mole %

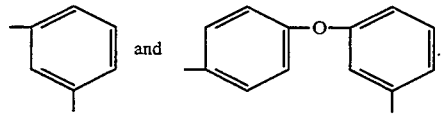

5. A polymer solution as in claim 1 wherein Y also consists of from 0 to 30 mole % of at least one of and 6. A fiber or film of the polymer of claim 1.

* * * * *